2 Sheets—Sheet 1.

D. T. TRIPP.
Bee-Hive.

No. 208,772. Patented Oct. 8, 1878.

Witnesses:
William H. Honne
Charles McFarren

Inventor
David T. Tripp
By C. E. Foster
Atty.

2 Sheets—Sheet 2.

D. T. TRIPP.
Bee-Hive.

No. 208,772. Patented Oct. 8, 1878.

Witnesses;
William A. Horine
Charles McFarren

Inventor
David T. Tripp
By C. E. Foster
atty.

UNITED STATES PATENT OFFICE.

DAVID T. TRIPP, OF WATERLOO, ILLINOIS.

IMPROVEMENT IN BEE-HIVES.

Specification forming part of Letters Patent No. 208,772, dated October 8, 1878; application filed May 26, 1877.

*To all whom it may concern:*

Be it known that I, DAVID T. TRIPP, of Waterloo, Monroe county, Illinois, have invented an Improvement in Bee-Hives, of which the following is a specification:

My invention consists in constructing a hive and suspending the comb-frames, as fully described hereinafter, so that when part of the hive is carried back the main body of honey is not disturbed, the entrance occupies its usual position, and the operator is sheltered.

Figure 1:
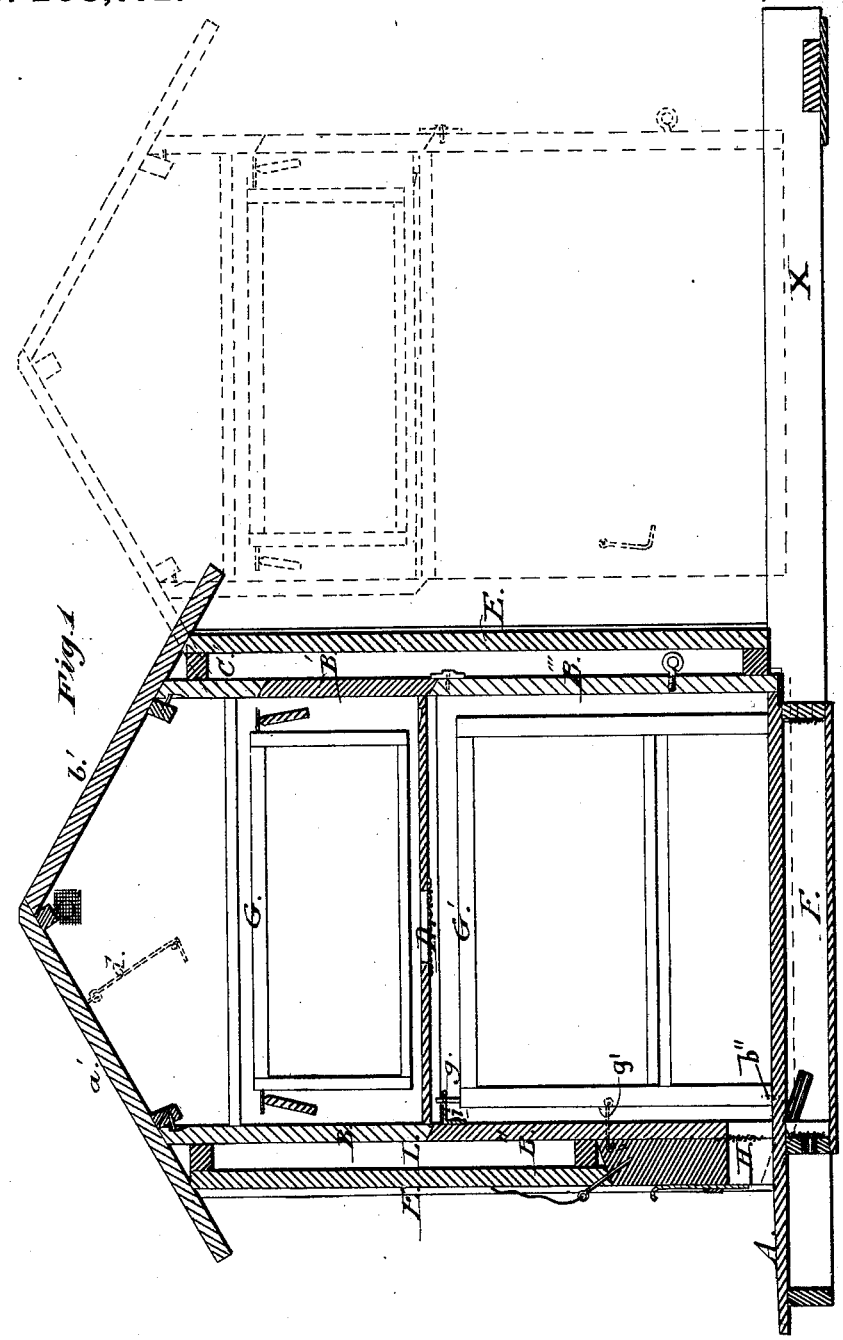
Figure 2:
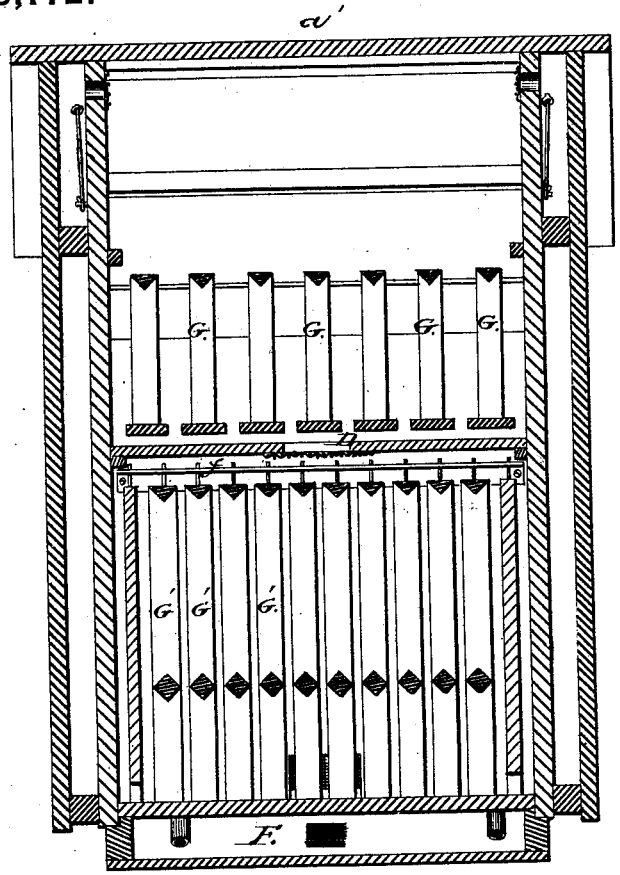
Figure 3:
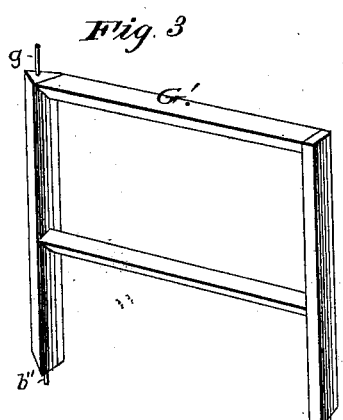
Figure 4:
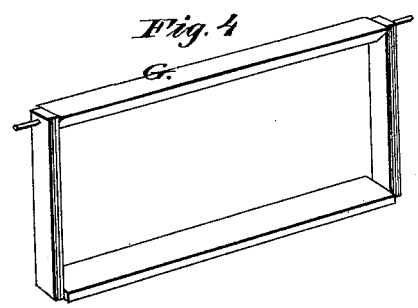

In the drawing, which forms part of this specification, Figure 1 is a sectional elevation of the improved hive; Fig. 2, a transverse section, and Figs. 3 and 4 detached perspective views.

The hive, in its general form, is of ordinary construction, being provided with the front inlet, H, moth-space F, and upper chamber, containing the usual suspended combs G, separated from a lower chamber by a ventilated floor, D. Part of the inner front wall, B'', is secured permanently to the base or floor A; but the remainder of the hive is movable, and may be slid back on ways X to the position shown in dotted lines, Fig. 1.

The hive is provided with the usual outer or double walls, E E, and with hinged top-pieces $a'$ $b'$, as shown.

To the front wall, B'', are connected the lower frames, G', each having a lower pivot or pin, $b''$, upper pivot, $g$, and hook $g'$. The pins $b''$ enter holes in the floor, and the pins $g$ are adapted to openings in a bracket, $i$, secured to the front wall at such a height as to permit the frame to be elevated to remove the lower pin from its opening and allow the frame to be detached.

As thus constructed the body of the hive screens the operator as it is carried back, while the main body of honey and the bees adjacent thereto are not disturbed; neither is the position of the opening H changed, so that the bees are not disturbed by their inability to find the entrance.

Without claiming, broadly, a hive having a part detachable,

I claim—

The combination of the stationary wall B'' and combs G', secured thereto by a bracket, $i$, pins $g$ $b''$, hooks $g'$, and the movable section of the hive, carrying the frames G and adapted to be slid on the projecting ways X X, as set forth.

May 22, A. D. 1877.

DAVID T. TRIPP.

Witnesses:
 WILLIAM H. HOWIE,
 CHARLES McFARREN.